United States Patent Office 3,089,754
Patented May 14, 1963

3,089,754
METHOD FOR PRODUCING HIGH-PURITY GRAPHITE
Erich Nedopil, Meitingen, near Augsburg, Germany, assignor to Siemens-Planiawerke Aktiengesellschaft für Kohlefabrikate, Meitingen, near Augsburg, Germany, a corporation of Germany
No Drawing. Filed Oct. 20, 1958, Ser. No. 768,059
Claims priority, application Germany Oct. 25, 1957
1 Claim. (Cl. 23—209.9)

My invention relates to a method for producing high-purity graphite suitable for use in nuclear reactors, for example as core or moderator material.

It is known to treat graphite with a halogen such as chlorine or flourine in order to eliminate alkali and alkali-earth metals, iron, aluminum, silicon, titanium, boron, and other impurities. The chlorine or flourine compounds thus evolving from the ash constituents to be eliminated are driven out of the porous graphite by means of a scavenging gas. It is known to completely scavenge these vaporous compounds out of the graphite by a current of scavenging gas which simultaneously prevents the absorption of chlorine and fluorine in the graphite. Heretofore used as scavenging gases were expensive noble gases, such as argon and helium. Nitrogen of highest obtainable purity has also been used for this purpose. The cost of the scavenging gas, even if the cheaper high-purity nitrogen is used, is considerably greater than the cost of the purifying halogen gas.

It has been found that nitrogen has a relatively great absorption cross-section for slow neutrons. With a pore volume of the graphite in an amount of 25% and with complete filling of the pores by nitrogen, the neutron absorption cross-section of the graphite increases approximately 0.26 mbarn. This is substantially the same value as would be produced by a boron impurity content of approximately 0.3 p.p.m. For explanation, it may be mentioned that 1 mbarn corresponds to a cross section of $10^{-27}$ cm.$^2$, and that the value of 1 p.p.m. is a measure of the amount of the element in percent by weight and is equal to $10^{-4}\%$ by weight.

It will be recognized that if for certain types of nuclear reactors the improvement obtainable by purifying the graphite of its boron content is not to be obviated by the impairment caused by the nitrogen content, the above-mentioned scavenging must be effected with the more expensive noble gas, such as argon or helium. It is known that oxygen, compared with the large absorption cross section of nitrogen, has a very slight absorption cross section for slow neutrons. However, oxygen cannot be used as a scavenging gas because it would cause burning of the hot graphite. Carbon monoxide, however, exhibits only a slight neutron absorption ability as compared to carbon and oxygen, and is also in equilibrium with the carbon also at high temperatures.

My invention is predicated upon the above-presented understanding and has for its aim to improve the above-mentioned method of purifying graphite by a halogen treatment. According to a feature of my invention, therefore, the scavenging gas applied in the method of purifying graphite by halogenizing the impurities to be removed therefrom consists of carbon monoxide. The use of carbon monoxide as a scavenging gas has the advantage of greatly reducing the cost of the purifying method.

It is to be taken into account that carbon monoxide is poisonous and forms an explosive gas mixture together with air. To eliminate both of these possibilities of danger, and in accordance with another feature of my invention, I perform the scavenging operation, subsequently to the halogenizing of the impurities, in two processing steps. During the first processing step, the graphite is scavenged at the highest processing temperature, preferably at about 2700° C., with nitrogen, until all volatile halogenides and halogen gases are removed from the exhaust hood which covers the graphitizing furnace in which the purification of the graphite bodies is performed. Such an exhaust hood is necessary because the halogen gases are likewise detrimental to health and require the provision of proper safety measures. After completing the nitrogen scavenging operation, the hood is lifted or removed and the scavenging is continued by supplying carbon monoxide (CO) so that no explosive gas mixture can collect beneath the exhaust hood. The gas escaping from the furnace during CO-scavenging is immediately burned off after passing through the graphitizing furnace.

The provision of pure carbon monoxide does not involve any difficulty because such carbon monoxide is commercially available in compressed and bottled condition. The cost of the bottled carbon monoxide corresponds approximately to that of bottled highest-purity nitrogen. However, it is preferable to produce the CO gas current in the graphitizing plant by passing carbon dioxide ($CO_2$) over active carbon at a temperature of approximately 1000° C., thus converting it into a pure current of carbon monoxide.

It should be understood, of course, that the foregoing disclosure relates to only a preferred embodiment of the invention and that it is intended to cover all changes and modification of the examples of the invention herein chosen for the purposes of the disclosure, which do not constitute departures from the spirit and scope of the invention as set forth in the appended claim.

I claim:

A method for producing high-purity graphite suitable as material in nuclear reactors, comprising treating a portion of graphite with a material selected from the group consisting of halogen gases and halogenide compounds in order to remove impurities from said graphite, and thereafter scavenging the graphite with a scavenging gas having a small neutron absorption cross section at a temperature at which all volatile halogenides and halogen gases are removable, said scavenging operation including two processing steps, said first step comprising treating said graphite at said temperature with high-purity nitrogen until all volatile halogenides and halogen gases are removed, and said second step comprising subsequently continuing the scavenging operation beginning at said temperature with carbon monoxide.

References Cited in the file of this patent
UNITED STATES PATENTS 2,624,698     Hickey _____ Jan. 6, 1953
2,734,800     Brooks _____ Feb. 14, 1956

OTHER REFERENCES

Hausner et al.: Materials for Nuclear Power Reactors, page 195, Reinhold Publ. Corp., New York, 1955.